United States Patent Office 3,285,948
Patented Nov. 15, 1966

3,285,948
HALIDES OF RUTHENIUM AND OSMIUM IN CONJUNCTION WITH COBALT AND IODINE IN THE PRODUCTION OF ETHANOL FROM METHANOL
George N. Butter, Terre Haute, Ind., assignor to Commercial Solvents Corporation, a corporation of Maryland
No Drawing. Filed Jan. 22, 1965, Ser. No. 427,497
8 Claims. (Cl. 260—642)

This application is a continuation-in-part of application Serial Number 114,322, filed June 2, 1961, now abandoned.

My invention generally relates to a process for the production of ethyl alcohol. In a particular aspect my invention relates to an improved process for the production of ethyl alcohol by the interaction of methanol, carbon monoxide, and hydrogen in the presence of a cobalt catalyst and an iodine promoter. In a further aspect my invention relates to an improved process for the synthesis of ethyl alcohol by the interaction of methanol, carbon monoxide and hydrogen in the presence of a cobalt catalyst, an iodine promoter and a secondary promoter selected from the ruthenium halides and osmium halides.

Ethyl alcohol is a substance which has long been used by man. It has been produced for centuries by the fermentation of the common grains. Within recent years, however, synthetic processes have been developed to produce this alcohol for industrial use. Such processes not only permit the use of more economical materials than those used in the fermentation procedures but permit production of a more standardized product in more easily predictable yields. It has been proposed that methanol is a logical inexpensive source for ethyl alcohol since methanol can be economically produced in great quantities from carbon monoxide and hydrogen. In fact, it has long been known that the methanol formation reaction can be carried further to produce ethyl alcohol by subsequently reacting the already produced methanol with carbon monoxide and hydrogen in the presence of a water-soluble cobalt catalyst and an iodine promoter at high temperatures and pressures. However, even though this reaction is theoretically sound and has been successfully attempted, large amounts of other materials such as aldehydes, esters, acids, and even gases such as methane are concurrently produced. The production of these materials, especially acetaldehyde, methyl acetate and acetals affects the yield of ethyl alcohol and also gives rise to complex separation problems.

A first embodiment of this invention is directed to an improved process whereby ethyl alcohol can be produced in good yields by the interaction of methanol, carbon monoxide, and hydrogen in the presence of a water soluble cobalt catalyst and an iodine promoter with concurrent production of only low amounts of by-product aldehydes, acids, esters, and carbon gases.

In a second embodiment of the present invention, the interaction of methanol, carbon monoxide and hydrogen is conducted in the presence of small effective amounts of ruthenium or osmium halide secondary promoter as well as the cobalt catalyst and iodine promoter. It has been found that use of ruthenium or osmium halides in the reaction as an auxiliary or second promoter provides unexpectedly higher yields of ethyl alcohol, with less by-product formation than that produced in the first embodiment, e.g., generally limiting the total production of organic by-products which are not capable of being recycled with the process to less than 3% of the final product. In fact in most cases the presence of the ruthenium or osmium halide effects a further reduction in the acetaldehyde by-product of the reaction.

The reaction mixture can include generally from about 0.1 wt. percent to 20 wt. percent water based on the methanol charged. Of the by-products normally found in this reaction, lessening of the amount of acetaldehyde formed is particularly desirable in that its presence can result in the formation of numerous high boiling condensation products of acetaldehyde which are found among the products of the homologation reaction. The improved results found with the ruthenium and osmium halides are especially interesting in that halides and compounds of other Group VIII metals such as platinum, palladium, rhodium, iron, nickel and iridium did not provide results significantly improved over those obtained with the cobalt catalyst and iodine promoter alone.

Generally, my process consists of conducting the reaction of methanol, hydrogen, and carbon monoxide at temperatures ranging from about 175 to about 230° C. under pressure, utilizing a ratio of methanol to cobalt metal contained in the catalyst of about 1 gram mole of methanol for every 0.33 to 0.01 gram of cobalt metal, for optimum results preferably about 1 gram mole of methanol for every 0.25 to 0.05 gram of cobalt; a ratio of methanol to iodine promoter of from about 1 gram mole of methanol for every 0.5 to 0.01 gram of iodine promoter, for optimum results more preferably about 1 gram mole of methanol for every 0.3 to 0.05 gram of iodine promoter; and a mole ratio of hydrogen to carbon monoxide within the range of from about 4:1 to about 1:2, preferably within the range of from about 2.2:1 to about 1.2:1. Too high of a ratio of hydrogen to carbon monoxide can insolubilize the cobalt catalyst and curtail the reaction.

The temperature limitations of my process are critical and an even narrower range of from about 190 to about 210° C. is more preferable for optimum limitation of the production of by-product materials.

Pressures which can be successfully utilized in my process should always be in excess of 1,000 p.s.i. and preferably in excess of 4,000 p.s.i. and up to about 15,000 p.s.i. The pressures should not generally exceed 15,000 p.s.i. because of the tendency to form glycol ethers at higher pressures. I generally more prefer to use pressures ranging from 5,000 to 12,000 p.s.i. (All gauge pressures.)

Most advantageously, the introduction of the hydrogen and CO gases is staged, that is, the hydrogen is introduced initially at a relatively low hydrogen to CO ratio, for instance within the range of from about 1.0:1 to about 1.2:1, and shortly thereafter the hydrogen to CO ratio is increased to, for instance, within the range of from about 1.5:1 to about 1.7:1. This stage introduction of the $H_2$ and CO gases avoids too high a partial pressure of hydrogen in the initial stages of the reaction, which high hydrogen partial pressure at this period has a tendency to cause insolubilization of the catalyst with consequential curtailment of the desired reaction.

The reaction time can vary but in all instances is that sufficient to effect completion of the desired reaction. Ordinarily, the period of time utilized to satisfactorily complete my process is generally from about 5 minutes to about three or four hours. In general, at relatively lower pressures the longer residence times (e.g., 2 hours) are necessary to obtain satisfactory conversion. Similarly, at relatively higher pressures the shorter residence times (e.g., 30 minutes) produce satisfactory conversions. In general, the residence time should not be longer than that necessary to achieve satisfactory conversion so as to minimize the formation of by-products which usually is higher at longer residence times. For optimum results using the secondary promoter, I have found it preferable to utilize a reaction time of about five minutes to two hours.

The reaction can be advantageously conducted in the absence of air. The reaction may be effected in the presence or absence of water as a reaction mixture.

Any source of cobalt soluble in the reaction medium which will yield a cobalt carbonyl or a hydro cobalt carbonyl compound can be utilized in the reaction of the present invention. These cobalt carbonyl yielding compounds include organic salts of cobalt, for instance, the water-soluble cobalt catalysts cobalt acetate, cobalt formate, cobalt propionate, etc., and the like, which under reaction conditions are converted to cobalt carbonyl forms. The iodine promoter can be suitably provided using ionic forms of iodine, e.g., KI, NaI, and LiI, or the molecular form $I_2$.

The secondary promoter of the present invention is ruthenium halide, or osmium halide, or a mixture thereof, and is employed in the reaction medium in catalytically effective amounts. The actual amount utilized can vary depending upon the particular reaction conditions selected and the particular osmium or ruthenium halide selected. Ordinarily, the osmium or ruthenium halide is added in amount so that the amount of osmium or ruthenium metal falls in the range of from about 0.003 to about 0.03 gram, preferably within the range of from about 0.005 to about 0.02 gram of ruthenium or osmium metal in the halide per gram mole of methanol. The prefererd osmium or ruthenium halides are those halides having a halogen with an atomic number between 15 and 55 (i.e. the chlorides, bromides, and iodides). The particularly preferred promoters are ruthenium chloride and ruthenium iodide.

The following examples serve to illustrate my invention; but it is not intended that my invention be limited to the exact procedure, specific apparatus, or specified materials set forth therein.

Example I

Into an 1,800 ml. stainless steel rocking bomb reactor equipped for pressurized reactions were charged 480 grams methanol, 0.4 gram iodine, and 8 grams cobalt acetate. Air was expelled from the reactor and the reactor was pressurized to 4,000 p.s.i., with hydrogen and carbon monoxide utilizing 2 moles of hydrogen for each mole of carbon monoxide. The temperature of the pressurized reaction mixture was quickly raised to 190–200° C. with a concurrent rise in pressure to about 5,800 p.s.i. The pressure and temperature were maintained at these levels for a period of two hours. At the end of the two-hour period, the reaction mixture was immediately cooled to about 0° C. The liquid reaction mixture weighed 650.7 grams and contained 22.6% ethyl alcohol, 20.6% water and 52.6% methanol.

Example II

The process of Example I was carried out over a period of three hours utilizing 480 grams of methanol, 0.35 gram of iodine, 7 grams of cobalt acetate. The reaction product from this reaction weighed 679 grams and contained 23% ethyl alcohol, 22% water and 44% methanol.

Examples III–V

Into the apparatus of Example I was charged 480 grams methanol, 3.8 grams iodine, 5.2 grams cobalt acetate and either 0.5 gram ruthenium chloride, 0.5 gram ruthenium iodide or 0.25 gram free metal ruthenium. Air was expelled from the reactor and the reactor was pressurized to 4,000 p.s.i. with hydrogen and carbon monoxide and the average and maximum temperature of each run are shown in the Table I below. The pressure rose to about 5,800 p.s.i. and was maintained at this level. After a one-hour reaction period, the reaction mixture was cooled to about 0° C. The product analysis is also shown in Table I. The weight percents of the products were determined by chromatographic analysis and are based on area percents.

In Example V, the initial pressurizing of the reactor to 4,000 p.s.i. was with a gas having a $H_2/CO$ mole ratio of 1.0. As the reaction proceeded at 5,800 p.s.i., the pressure was maintained at 5,800 p.s.i. by the addition of a gas having a mole ratio of $H_2/CO$ of 1.7.

TABLE I

| Example | Promoter Used | Mole Ratio $H_2/CO$ | Average ° C. | Max. Temp. ° C. | Gross Product Wt. Grams | Percent by Wt. of Gross Product | | | | | |
|---|---|---|---|---|---|---|---|---|---|---|---|
| | | | | | | $H_2O$ | ETOH | 1-PrOH | 1-BuOH | EtAc | $CH_3CHO$ |
| III | $RuCl_3$ | 1.5 | 197 | 202 | 733.9 | 24.2 | 30.4 | 1.82 | .40 | 2.18 | 0.97 |
| IV | $RuI_3$ | 1.5 | 211 | 219 | 766 | 26.5 | 33.3 | 2.78 | .39 | 2.67 | 1.63 |
| V | Ru | 1.0–1.7 | 206 | 216 | 751.7 | 28.1 | 17.2 | .96 | .13 | 2.93 | 8.25 |

The data of Examples III to V demonstrate the excellent results obtained when employing the ruthenium halide promoter of the invention, for instance, in comparison with free ruthenium metal. As shown, the halide produced significantly greater yields of ethanol at comparable temperatures while producing significantly lower amounts of by-products as indicated by the lower amounts of acetaldehyde produced. The free acetaldehyde present in the reaction mixture at any one moment permits the intermolecular condensation to higher molecular weight undesirable by-products. The reaction can be conducted at the relatively low temperatures shown which aids in maintaining the catalyst system in a soluble form.

Examples VI to VIII

Various homologations runs were conducted in accordance with the method of Example I using 480 grams of methanol, 5.2 grams of cobalt acetate and 3.8 grams of iodine, a pressure of 5,800 p.s.i. and the promoters, temperatures and $H_2/CO$ ratios shown in Table II below. These examples include reactions using ruthenium iodide and water, ruthenium chloride and water, and osmium chloride. The amounts of these latter materials and the analysis of the reaction products are shown in Table II. The gram-moles of the products were determined by chromatographic analysis and are based on area percents. The reaction period in these Examples VI–VIII was one hour.

TABLE II

| Example | Secondary Promoter | Feed Gas Mole Ratio $H_2:CO$ | Avg. Temp. During Run ° C. | Max. Temp. During Run ° C. | Gram-moles in Gross Product | | | | |
|---|---|---|---|---|---|---|---|---|---|
| | | | | | EtOH | 1-PrOH | 1-BuOH | EtAc | $CH_3CHO$ |
| VI | $H_2O$-54 gms., $RuI_3$-0.5 gms | 1.51 | 203 | 214 | 4.49 | .21 | .07 | .20 | .34 |
| VII | $H_2O$-54 gms., $RuCl_3$-0.5 gms | 1.47 | 203 | 214 | 5.04 | .26 | .03 | .20 | .15 |
| VIII | $OsCl_3$-0.5 gms | 1.43 | 204 | 210 | 3.74 | .18 | .11 | .12 | .74 |

Examples IX to XII

Various homologation runs were conducted in accordance with the method of Example I using 480 grams of methanol, 5.2 grams of cobalt acetate and 3.8 grams of iodine, and a pressure of 5,800 p.s.i. The temperatures and H₂/CO ratios are shown in Table III below. In the runs of Examples IX to XI no secondary promoter was used whereas in the run of Example XII, ruthenium chloride was used as a secondary promoter. The gram-moles of the products were determined by chromatographic analysis and are based on area percents. In runs IX to XI, the initial pressuring of the reactor was with a gas mixture of hydrogen and carbon monoxide in the mole ratio of about 1:1. The reactor was heated and a pressure of 5,800 p.s.i. was achieved. As the reaction proceeded the pressure was maintained at 5,800 p.s.i. by the addition of a gas mixture of hydrogen and carbon monoxide having the mole ratio shown in Table III. The reaction period in these Examples IX to XII was one hour.

ing a ratio of methanol to cobalt metal contained in the catalyst of one gram mole of methanol to 0.33 to 0.01 gram of cobalt metal, a ratio of methanol to iodine promoter of 1 gram mole of methanol to 0.01 to 0.5 gram of iodine promoter, a ratio of methanol to said metal halide promoter of about one gram mole of methanol to 0.003 to 0.03 gram of metal in the metal halide, and a mole ratio of hydrogen to carbon monoxide of from about 4 to 1 to about 1 to 2.

3. The process of claim 2 wherein the halogen of said metal halide promoter has an atomic number between 15 and 55.

4. The process of claim 3 wherein the metal halide is a ruthenium halide having an atomic number between 15 and 55.

TABLE III

| Example | Secondary Promoter | Feed Gas Mole Ratio H₂:CO | Avg. Temp. During Run °C. | Max. Temp. During Run °C. | Gram-moles in Gross Product | | | | | Moles of Methane Produced |
|---|---|---|---|---|---|---|---|---|---|---|
| | | | | | EtOH | 1-PrOH | EtAc | CH₃CHO | MeAc | |
| IX | None | 1.44 | 195 | 196 | 1.43 | 0.05 | 0.18 | 2.09 | 0.48 | 0.84 |
| X | None | 1.53 | 209 | 211 | 3.09 | 0.15 | 0.26 | 1.45 | 0.46 | 0.74 |
| XI | None | 1.53 | 221 | 224 | 4.67 | 0.27 | 0.33 | 0.79 | 0.39 | 1.22 |
| XII | RuCl₃–0.25 gms | 1.43 | 206 | 209 | 5.18 | 0.30 | 0.19 | 0.25 | 0.30 | 0.30 |

Examples IX, X and XI illustrate that at increasing temperatures (195-209-221° C.) increasing amounts of ethanol are produced (1.43-3.09-4.67). However even at the highest temperature of 221° C. (Example XI) an appreciable quantity of acetaldehyde (0.79) is obtained in the product. Also an appreciable quantity of undesirable methane is produced (1.22 moles). Comparing the results of Examples IX-XI with the run of Example XII, which was promoted by a secondary promoter, and conducted at a temperature of 206° C., it may be noted that a higher conversion to ethanol (5.18) was achieved and, further, a much lower amount of acetaldehyde (0.25) and a lower amount of methane (0.30) were produced, which markedly demonstrates the desirable results that may be achieved when using a secondary promoter of the present invention.

It is claimed:

1. In a process for the synthesis of ethyl alcohol comprising reacting under pressures of about 1,000 to about 15,000 p.s.i. and a temperature from about 175 to 230° C. a mixture consisting essentially of methanol, carbon monoxide and hydrogen in the presence of a cobalt-containing catalyst soluble in the reaction medium and an iodine promoter to produce ethyl alcohol, the improvement which consists essentially of conducting the reaction in the presence of catalytic amounts of a secondary promoter selected from the group consisting of ruthenium halide and osmium halide.

2. A process for the synthesis of ethanol which consists essentially of reacting a mixture of methanol, carbon monoxide and hydrogen at a temperature ranging from about 175° to 230° C. at a pressure of at least 4,000 p.s.i. in the presence of a water soluble, cobalt-yielding compound as catalyst, an iodine promoter and a secondary metal halide promoter selected from the group consisting of ruthenium halide and osmium halide, while maintain- 5. The process of claim 2 wherein the halide is osmium halide.

6. The process of claim 2 wherein the halide is osmium chloride.

7. A process for the synthesis of ethanol which consists essentially of reacting a mixture of methanol, carbon monoxide and hydrogen at a temperature ranging from about 180° to about 210° C. and a pressure from about 4,000 p.s.i. to 14,000 p.s.i. in the presence of an iodine promoter, a water-soluble, cobalt-yielding compound as catalyst, and ruthenium halide whose halide is a halogen having an atomic number between 15 and 55, while maintaining a ratio of methanol to cobalt metal contained in the catalyst of 1 gram mole of methanol to 0.33 to 0.01 gram of cobalt metal, a ratio of methanol to iodine promoter of 1 gram mole of methanol to 0.01 to 0.5 gram of iodine promoter, a ratio of methanol to said ruthenium halide promoter of about 1 gram mole of methanol to 0.003 to 0.03 gram of ruthenium metal, and a mole ratio of hydrogen to carbon monoxide within the range of from about 4:1 to about 1:2.

8. The process of claim 7 wherein the ruthenium halide is ruthenium iodide.

References Cited by the Examiner

UNITED STATES PATENTS 2,623,906  12/1952  Gresham _____ 260—642

FOREIGN PATENTS 877,598  5/1953  Germany.
381,185  9/1932  Great Britain.

OTHER REFERENCES

Wender et al., "Science," vol. 113 (1951), pp. 206–7.

LEON ZITVER, *Primary Examiner.*

J. E. EVANS, *Assistant Examiner.*